US009738351B2

(12) United States Patent
Bergua (10) Patent No.: US 9,738,351 B2
(45) Date of Patent: Aug. 22, 2017

(54) FLOATING WIND TURBINE (71) Applicant: ALSTOM RENEWABLE TECHNOLOGIES WIND B.V., Ridderkerk (NL)

(72) Inventor: Roger Bergua, Barcelona (ES)

(73) Assignee: Alstom Renewable Technologies Wind BV, Breda (NL)

( * ) Notice: Subject to any disclaimer, the term of this patent is extended or adjusted under 35 U.S.C. 154(b) by 0 days.

(21) Appl. No.: 14/901,959

(22) PCT Filed: Jul. 1, 2014

(86) PCT No.: PCT/EP2014/063980
§ 371 (c)(1),
(2) Date: Dec. 29, 2015

(87) PCT Pub. No.: WO2015/000909
PCT Pub. Date: Jan. 8, 2015

(65) Prior Publication Data
US 2016/0368572 A1 Dec. 22, 2016

(30) Foreign Application Priority Data
Jul. 2, 2013 (EP) .................................... 13382263

(51) Int. Cl.
*B63B 35/44* (2006.01)
*B63B 21/50* (2006.01)
*F03D 13/25* (2016.01)

(52) U.S. Cl.
CPC ............ *B63B 21/502* (2013.01); *B63B 35/44* (2013.01); *F03D 13/25* (2016.05); *B63B 2035/446* (2013.01); *Y02E 10/727* (2013.01)

(58) Field of Classification Search
CPC ........ B63B 21/502; B63B 35/44; E03D 13/25
See application file for complete search history.

(56) References Cited

U.S. PATENT DOCUMENTS

| 5,147,148 A * | 9/1992 | White ................... B63B 21/502 405/199 |
| 5,439,321 A | 8/1995 | Hunter |
| 2008/0017093 A1* | 1/2008 | Couch ................... B63B 21/502 114/265 |

FOREIGN PATENT DOCUMENTS

| DE | 10 2008 029984 A1 | 12/2009 |
| WO | WO 2006/038091 A2 | 4/2006 |

OTHER PUBLICATIONS

International Search Report mailed Sep. 28, 2014, in related PCT Application No. PCT/EP2014/063980, 10 pp.
(Continued)

*Primary Examiner* — Stephen Avila
(74) *Attorney, Agent, or Firm* — Dority & Manning, P.A.

(57) ABSTRACT

Floating TLP wind turbine comprising a buoyancy structure, a plurality of braces, one or more tensioned mooring lines for each brace, and a support structure arranged on the buoyancy structure. The braces extend radially outwardly from a region of the buoyancy structure or support structure, each brace having a distal end portion with respect to the buoyancy structure or support structure. Each distal end portion of the braces comprises a guiding element to allow a guided passage of a tensioned mooring line. Each of the tensioned mooring lines is anchored to the seabed at a first end, and attached/coupled to a region of the buoyancy structure or support structure at a second end, said region being above the region of the buoyancy structure or support structure from which the braces extend radially outwardly. Each tensioned mooring line is guided by the guiding element of the corresponding brace.

20 Claims, 4 Drawing Sheets

(56) References Cited

OTHER PUBLICATIONS

Written Opinion mailed Sep. 28, 2014, in related PCT Application No. PCT/EP2014/063980, 6 pp.

* cited by examiner

FLOATING WIND TURBINE

This application claims the benefit of European Patent Application EP 13382263.5 filed 2 Jul. 2013.

The present invention relates to a floating Tension Leg Platform (TLP) wind turbine.

BACKGROUND ART

Offshore wind turbines are being developed that instead of resting on fixed-bottom support structures have a floating support structure.

Several configurations have been proposed for the floating or buoyancy structures: many of these employ floater elements in the form of hollow floater tanks that in use are arranged substantially below the mean sea level and provide a buoyancy force to support the wind turbine. Ballast and/or mooring lines anchored to the seabed are provided for achieving stability.

In some of these floating wind turbines, the buoyancy structure is designed to provide an excess buoyancy force and is maintained floating under the sea level by taut mooring lines tensioned by the excess buoyancy force.

For example, concepts have been developed such as the "Taught Leg Buoy" (TLB) floating wind turbine, with a slender cylindrical buoy and a plurality of tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwardly with respect to the vertical axis of the wind turbine. The TLP arms may be part of the buoyancy structure, for example in the form of hollow spokes that extend radially outwardly from a hollow central hub, or may be arranged above the sea level, in which case the buoy may be a slender cylindrical tank like in the TLB concept.

The buoyancy structure of a floating offshore wind turbine is subjected to several loads, such as for example the weight of the wind turbine itself, impacts, forces exerted by waves, currents and tides, and, depending on the configuration of the wind turbine, also aerodynamic forces associated with the wind, rotor rotation, etc. In the presence of such loads floating wind turbines may have a tendency to destabilize.

In TLP configurations, the braces can suffer significant shear and bending forces due to the tension to which the mooring lines are subjected. These significant vertical forces require the braces to be very strong and thus heavy in order to suitably withstand them.

Moreover, these vertical forces may be subjected to some kind of oscillations due to other loads, such as those mentioned above (from waves, from wind, etc.). These oscillations may aggravate the effects of said vertical forces on the braces.

Figure 1:
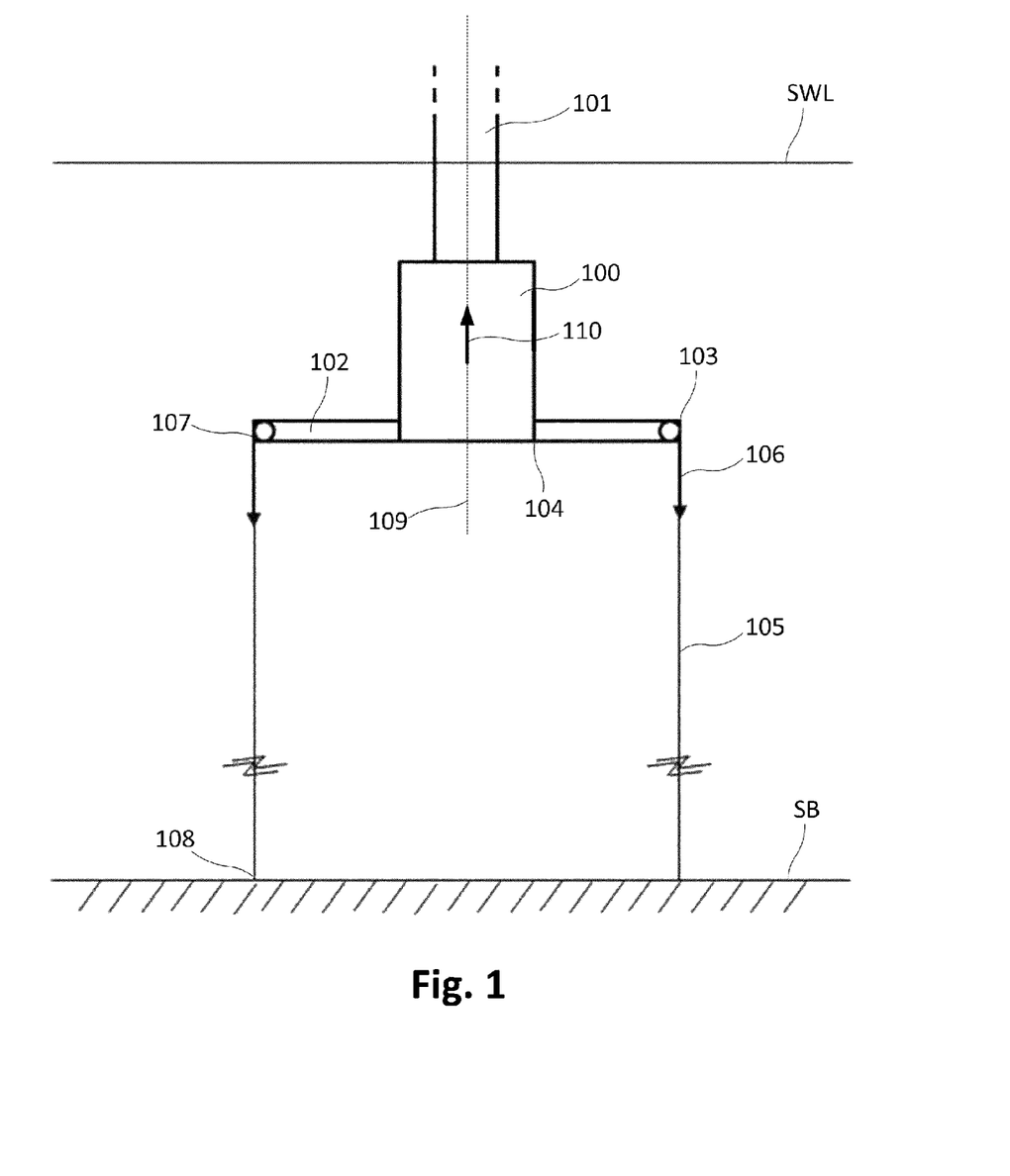
FIG. 1 schematically represents part of a prior art TLP wind turbine.

FIG. 1 schematically and partially shows a typical prior art TLP wind turbine comprising a floater tank 100, which provides an excess buoyancy force 110, and a tower 101 arranged on the floater tank 100. This wind turbine also comprises a plurality of arms 102 extending radially outwardly (with respect to a longitudinal axis 109 of the tower 101 and/or the tank 100) from a bottom region of the tank 100. Each arm 102 has an associated tensioned mooring line 105 having a first end 108 anchored to the seabed SB and a second end 107 attached to a distal region 103 (with respect to the axis 109) of the arm 102.

FIG. 1 shows how the tension to which a mooring line 105 is subjected causes a top-down force 106 which may be quite significant and may cause a significant bending stress on the corresponding arm 102. In particular, the proximal portion 104 of the arm 102 especially suffers this bending stress. This bending stress may require the arms 102 to have a very strong configuration which is normally based on large amounts of material. These strong configurations may thus be quite expensive.

There still exists a need for a new floating TLP wind turbine which at least partially reduces the abovementioned problems. It is an object of the present invention to fulfil such a need.

SUMMARY OF THE INVENTION

In a first aspect, the present invention provides a floating Tension Leg Platform (TLP) wind turbine comprising a buoyancy structure, a plurality of braces, one or more tensioned mooring lines for each brace, and a wind turbine support structure arranged on the buoyancy structure. The buoyancy structure comprises at least one floater tank which provides an excess buoyancy force. The plurality of braces extend radially outwardly from a region of the buoyancy structure or the wind turbine support structure, each brace having a distal end portion with respect to a longitudinal central axis of the buoyancy structure or the wind turbine support structure. Each of the tensioned mooring lines has a first end and a second end, such that it is anchored to the seabed at its first end and attached/coupled to a region of the buoyancy structure or the wind turbine support structure at its second end, said region being above the region from which the braces extend radially outwardly. Each of the distal end portions of the braces comprises a guiding element, such that the corresponding tensioned mooring line has a guided passage by said guiding element.

The proposed configuration permits significantly reducing bending stress on the braces in a significantly cheap manner. In this configuration, each mooring line causes, in fact, a downwards force on its associated brace, but it also causes an upwards force due to the coupling of the mooring line to a region of the buoyancy structure or the wind turbine support structure above the braces. This upwards force compensates in some way the downwards force, such that bending stress on the brace is reduced.

Instead of generating a significant bending stress, this configuration generates a compression stress on the braces. That is, each mooring line presses its brace against the region of the buoyancy structure or the wind turbine support structure from which the brace extend radially outwardly. This pressure caused by the mooring line on the brace causes a compression of the brace in a longitudinal direction of the brace. Therefore, this reduction of bending stress and increase of compression stress may require the braces to be less strong in comparison with the cases where a predominant bending stress is suffered by the braces. This may permit e.g. using less material to construct the braces and, hence, making them cheaper.

Moreover, each mooring line is not attached or coupled to the brace, but it passes in a guided manner by the corresponding guiding element of the brace. This permits having a uniform tension of the mooring line along its whole length. In other words, the tension in the region of the mooring line between the seabed and the brace is substantially equal to the tension of the region of the mooring line between the brace and the region of the buoyancy structure or the wind turbine support structure to which the mooring line is attached or coupled. This uniformity of the tension along the entire mooring line may cause the brace to suffer less bending stress.

A guiding element may be based on a hole, or a pulley, or a U-shaped depression, or the like, in the corresponding brace. In some implementations, all the guiding elements may be of the same type (hole, pulley, U-shaped depression, or the like). In alternative implementations, different types of guiding elements may be provided in the same TLP wind turbine. Combinations of them in a same brace are also possible. Having a hole or a U-shaped depression as a guiding element may be cheaper than having a pulley, but the latter option may cause less wear on the mooring line than the former one.

Throughout the disclosure, pulley is used to cover any form of wheel or roller that can guide a line or cable.

In some implementations using a pulley as guiding element, the pulley may be movable along the length of the corresponding brace. To this end, the brace may be provided with e.g. rails or the like to permit the pulley to slide along the brace, and any type of suitable means for fixing the pulley on a chosen position. Also, for example, a hydraulic system may be provided to drive the pulley along the corresponding brace. An aspect of having a movable pulley along the brace may be that the tension of the mooring line guided by the pulley may be easily varied, which may be advantageous during e.g. maintenance and/or (re)adjustment operations.

In some embodiments, the region of the buoyancy structure or the wind turbine support structure from which the braces extend radially outwardly may be a region of the floater tank, which may be a top or a bottom region of the floater tank. If the braces extend radially outwardly from a bottom region of the tank, the region to which the mooring lines are attached at its second end may be an upper region of the floater tank itself, or a region of the wind turbine support structure. If the braces extend radially outwardly from a top region of the tank, the region to which the mooring lines are attached at its second end may be a region of the wind turbine support structure.

An aspect of having the braces extending radially outwardly from a region of the floater tank may be that the braces may contribute to improve the buoyancy of the buoyancy structure. This may thus provide some benefits in terms of e.g. increased stability, requiring a smaller and cheaper floater tank, etc.

In some embodiments, the region of the buoyancy structure or the wind turbine support structure from which the braces extend radially outwardly may be a region underneath the sea level or, alternatively, a region above the sea level.

Having the braces above the sea level may permit a suitable transmission of e.g. aerodynamic loads (from upper regions of the wind turbine, such as e.g. the blades) to the mooring lines and finally to the seabed. This transmission of loads (from upper parts of the wind turbine) to the mooring lines (and seabed) may significantly reduce the loads to be suffered by a lower part (below the region to which the mooring lines are attached) of the wind turbine. The size of this lower part with reduced loads from upper parts of the wind turbine may be maximized by attaching the mooring lines to the wind turbine support structure at a height as large as possible. This height should however be below a safety height to avoid collisions between the blades and the mooring lines. These principles may thus permit the TLP wind turbine to have a lower structure significantly unaffected by loads from upper parts of the wind turbine, which may be relatively large and quite stable, light and cheap.

According to embodiments of the invention, the wind turbine support structure may comprise a tower and a transition piece between the tower and the buoyancy structure. Alternatively, the wind turbine support structure may comprise a tower, whereas the buoyancy structure may further comprise a transition piece between the tower and the floater tank.

Therefore, according to the diverse embodiments previously described, different configurations for the TLP wind turbine are possible depending on from where the braces extend radially outwardly and to where the mooring lines are attached at one of their ends. For example: the braces can extend radially outwardly from a bottom region of the tank and the mooring lines can be attached at one of their ends to an upper region of the tank itself, the transition piece or the tower; the braces can extend radially outwardly from a top region of the tank and the mooring lines can be attached to a region of the transition piece or the tower; the braces can extend radially outwardly from a region of the transition piece and the mooring lines can be attached to a region of the tower; etc.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of examples of the present invention. It will be understood by one skilled in the art however, that examples of the present invention may be practiced without some or all of these specific details. In other instances, well known elements have not been described in detail in order not to unnecessarily obscure the description of the present invention.

Figure 2:
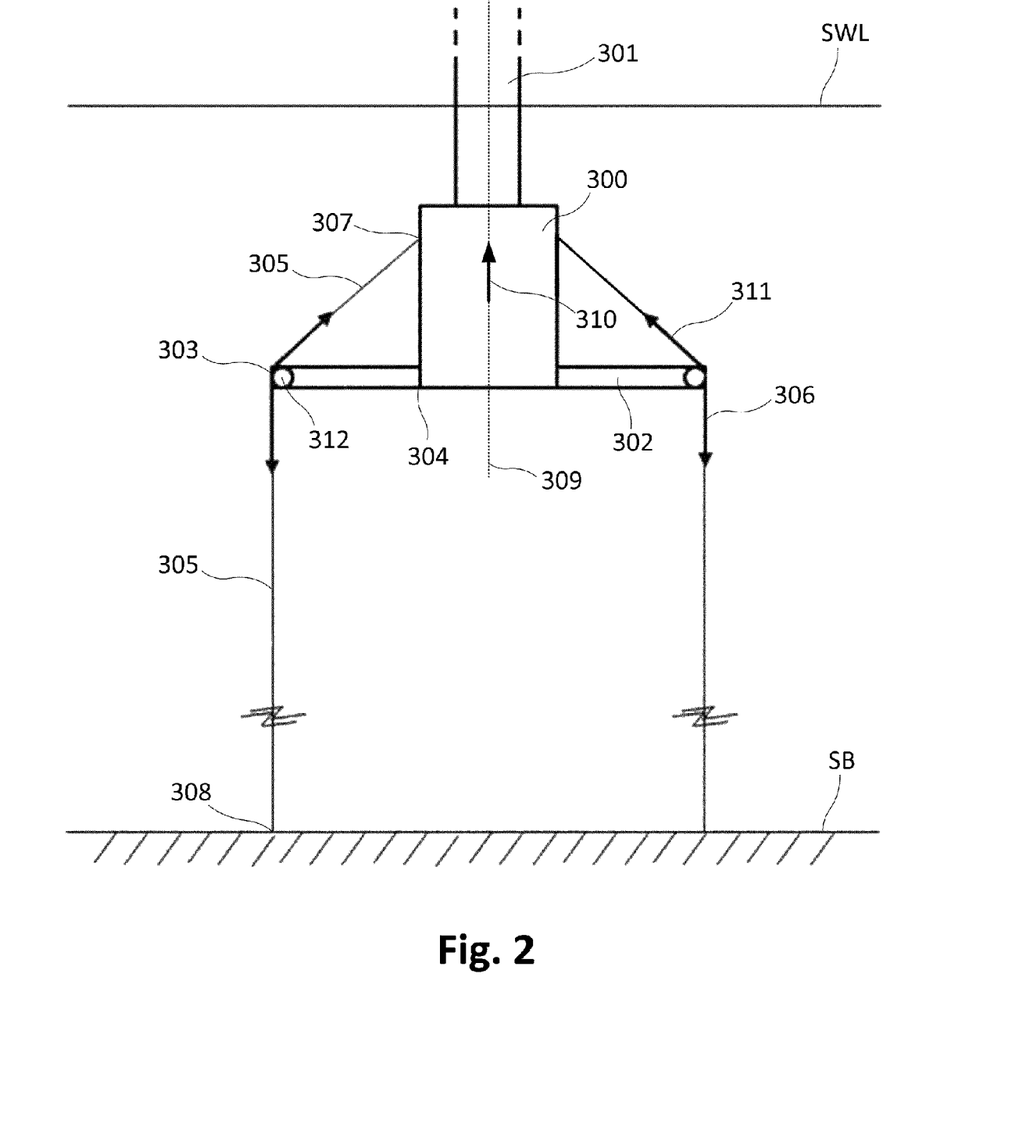
FIG. 2 schematically represents part of a TLP wind turbine according to an embodiment of the invention.

FIG. 2 schematically represents a part of a TLP wind turbine according to an embodiment of the invention. The wind turbine is shown comprising a buoyancy structure having a floater tank 300 which provides an excess buoyancy force 310, and a plurality of braces 302 extending radially outwardly from a bottom region of the floater tank 300. Each brace 302 has a distal end portion 303 with respect to a longitudinal central axis 309 of the buoyancy structure. The braces 302 are coupled or attached to the floater tank at their proximal ends 304. In this example, the wind turbine further comprises a tensioned mooring line 305 for each brace 302, each of the tensioned mooring lines 305 having a first end 308 and a second end 307, and a tower 301 arranged on the buoyancy structure.

In this TLP wind turbine example, each of the distal end portions 303 of the braces 302 comprises a guiding element 312 to allow a guided passage of a tensioned mooring line 305. Each of the tensioned mooring lines 305 is anchored to the seabed SB at its first end 308, and attached/coupled to a top region of the floater tank 300 at its second end 307. This top region of the floater tank 300 is above the region of the buoyancy structure from which the braces 302 extend radially outwardly, and each tensioned mooring line 305 is guided by the guiding element 312 of the corresponding brace 302.

A mooring line 305 may be a cable, or a chain, or a similar element suitable for its expected function. This cable (or chain or the like) may be made of a material and have a configuration suitable for resisting a given tension depending on the design of the TLP wind turbine. Simulations (with suitable software, e.g. FEM software) and/or experiments (with e.g. a prototype under controlled conditions) may be performed to determine suitable properties for the mooring lines 305. Cables (or chains or the like) to be used as mooring lines 305 may be made of a material with certain stiffness, such as e.g. steel and/or polyester, and/or may be formed of e.g. a number of wires. In some implementations, all the mooring lines 305 may have a common configuration, even though, alternatively, different mooring lines 305 may have different configurations.

A guiding element may be a hole, or a pulley, or a U-shaped depression in the corresponding brace 302, or any other arrangement allowing a guided passage of a corresponding tensioned mooring line 305. In some implementations, all the guiding elements may have the same configuration (hole, pulley, U-shaped depression, or similar), even though, alternatively, different guiding elements may have different configurations (hole, pulley, U-shaped depression, or similar). Having a hole or a U-shaped depression may be cheaper than having a pulley, but a pulley may cause smaller wear of the cable or chain or the like.

In some implementations where one or more of the guiding elements are a pulley, this pulley 312 may be movable along the length of the corresponding brace 302. This mobility of the pulley 312 may be achieved e.g. by having, in the corresponding brace 302, an elongated empty (without material) region configured to act as a guide for the pulley 312 to move through it. This elongated empty region may comprise a rail-based arrangement, such that a pin may slide along the length of said elongated empty region guided by corresponding rails. This pin may act as a shaft around which the pulley 312 may rotate.

Any known fixing means may also be provided to fix the pulley 312 at a desired location along the brace 302. A system for moving the pulleys, such as e.g. a hydraulic system, may be provided to cause a controlled motion of the pulley 312 along the brace 302. An aspect of having movable pulleys 312 may be that the tension of the cable(s) or chain(s) or the like (constituting the mooring lines 305) may be suitably varied to adjust the tension of the mooring lines. This may provide some benefits in the context of maintenance and/or (re)adjustment operations.

Alternatively to having the braces 302 extending radially outwardly from a bottom region of the floater tank 300 (as shown in FIG. 2), the braces 302 may extend radially outwardly from a top region of the floater tank 300. In any of these implementations, the braces 302 may contribute to increase the buoyancy of the buoyancy structure, which may permit having e.g. a smaller floater tank with an acceptable provision of excess buoyancy force and stability for the wind turbine.

In the embodiments where the braces 302 extend radially outwardly from a bottom region of the floater tank 300, the region to which the mooring lines 305 are attached may be an upper region of the floater tank 300 or a region of the tower 301. In the embodiments where the braces 302 extend radially outwardly from an upper region of the floater tank 300, the region to which the mooring lines 305 are attached may be a region of the tower 301.

In some embodiments, the TLP wind turbine may comprise a transition piece (not shown) arranged between the tower 301 and the floater tank 300, in which case, the region of the buoyancy structure from which the braces extend radially outwardly may be a region of the transition piece underneath the sea water level SWL or, alternatively, a region of the transition piece above the sea water level SWL. In any of these embodiments, the region to which the mooring lines 305 are attached may be a region of the transition piece, or a region of the tower 301.

FIG. 2 also shows how each mooring line 305 provides a downwards force 306 and a (tilted) upwards force 311. This last force 311 has a vertical and a horizontal component. These force components and their effects on the brace in combination with the downwards force 306 will be discussed in detail with reference to FIGS. 3a and 3b.

Figure 3A:
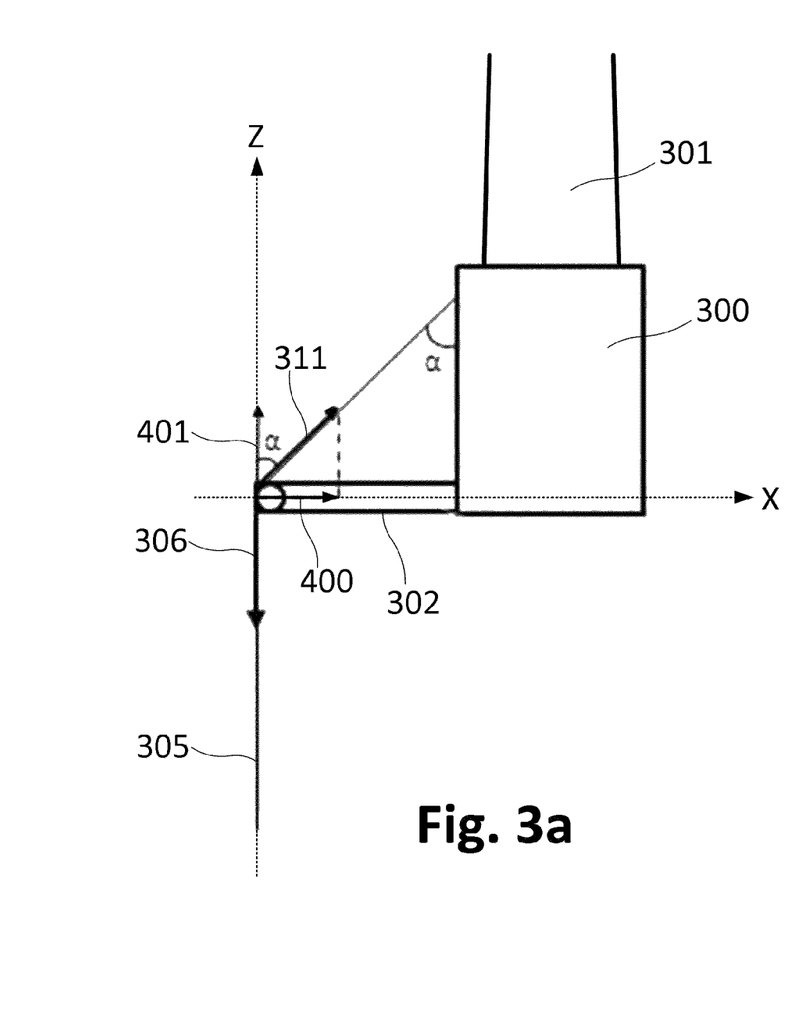
FIGS. 3a and 3b schematically represent some forces and associated force components participating in the TLP wind turbine of FIG. 2.
Figure 3B:
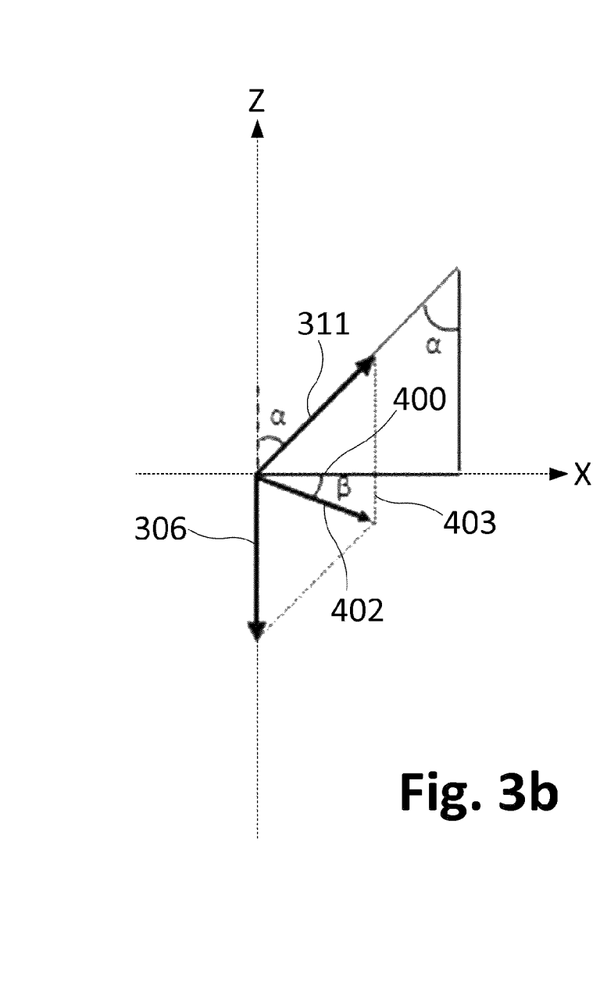

FIGS. 3a and 3b schematically represent some forces and associated force components participating in the TLP wind turbine of FIG. 2. FIG. 3a shows the decomposition of the (tilted) upwards force 311 (from FIG. 2) into corresponding horizontal 400 and vertical 401 force components. The vertical force component 401 opposes the downwards force 306 (from FIG. 2) such that bending stress on the brace 302 is significantly reduced in comparison with prior art TLP wind turbines. The horizontal force component 400 means that the mooring line 305 presses the brace 302 against the floater tank 300 in a longitudinal direction of the brace 302, i.e. the mooring line 305 exerts a compression force 400 on the brace 302. It can thus be concluded that in wind turbines according to embodiments of the invention a predominant compression force instead of a predominant bending force may be provided.

The person skilled in the art will appreciate that said predominant compression force 400 may require the brace to have less strength than in the case of a predominant bending force 306 is present instead of such a predominant compression force 400. Hence, the braces 302 may be constructed with less material and, consequently, they can be significantly cheaper.

FIG. 3b shows the resultant force 402 resulting from the downwards force 306 and the tilted upwards force 311. As it can be easily appreciated, the resultant force 402 has a horizontal force component (or compression force) 400 and a vertical force component (or bending force) 403, the former one 400 being stronger than the latter one 403. Therefore, FIG. 3b clearly shows that a main characteristic of wind turbines according to embodiments of the invention is that the braces 302 are subjected to a predominant compression force 400 and to a non-predominant bending force 403, which permits having less strong and thus cheaper braces 302.

FIGS. 3a and 3b also indicate the angle $\alpha$ between the floater tank 300 (or a longitudinal axis of the tank or the tower) and the mooring line 305. FIG. 3b also shows the angle $\beta$ between the resultant force 402 and a longitudinal axis (X axis) of the brace 302. There is a trigonometric relation between the angles β and α such that β=α/2. This relation is always satisfied and, hence, for a given inclination α (which is a design parameter), the angle β can be derived by applying said relation. The angle β will thus be smaller when angle α is smaller, such that the vertical force component (or bending force) 403 will also be smaller the smaller the angle α. So, in general, it may be desirable (to reduce bending stress) the mooring line 305 to be attached to the tower 301 or transition piece (between the tower 301 and the buoyancy structure) at a height as large as possible to make the angle α as small as possible.

Still with reference to FIGS. 3a-3b, taking into account that the forces 306 and 311 are of the same amount and taking into account trigonometric principles, the vertical force component 401 of the force 311 may be expressed as follows:

401=306·cos(α)　　　　　　　　　　　　　　[expression 1]

and the vertical force component 403 of the resultant force 402 may be expressed as follows:

403=306−306·cos(α)=306·(1−cos(α))　　　　　[expression 2]

Figure 4A:
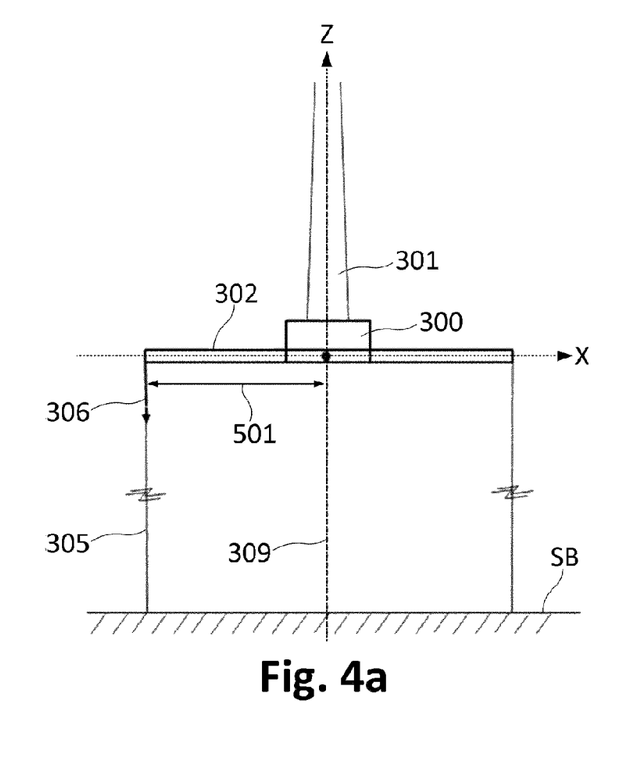
FIGS. 4a and 4b schematically represent respective parts of a prior art TLP wind turbine and of a wind turbine according to a further embodiment of the invention, and show some forces participating in both TLP configurations.
Figures 4B, 4C:
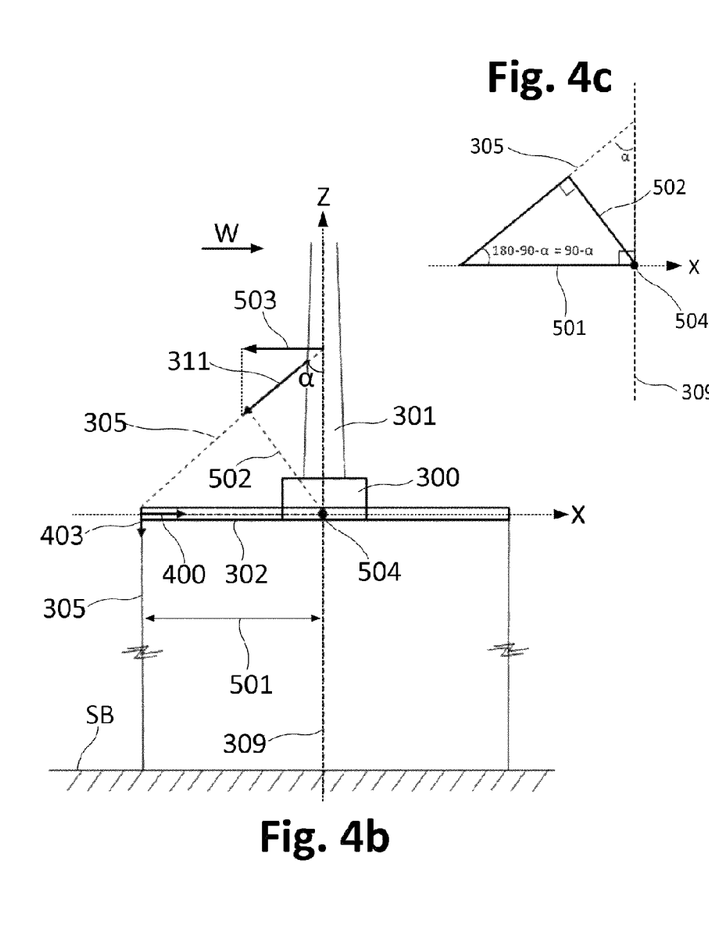
FIG. 4c is an isolated view of a triangle shown in FIG. 4b which is constituted by a tilted region of a mooring line, and corresponding regions of axes from FIG. 4b.

This last expression 2 will be used bellow in further calculations with reference to FIG. 4b.

FIGS. 4a and 4b schematically represent respective parts of a prior art TLP wind turbine and of a TLP wind turbine according to a further embodiment of the invention, and show some forces (and, if it is the case, associated force components) participating in said TLP configurations. In particular, FIG. 4a shows a part of a prior art TLP wind turbine in which only a downwards force 306 is acting on the braces 302, and FIG. 4b shows a part of a TLP wind turbine according to an embodiment of the invention in which further forces can be identified.

In both TLP wind turbines only the axes X and Z are shown. However, the Y axis can be implicitly identified by taking into account the shown X and Z axes. Both FIGS. 4a and 4b will be used to conclude that wind turbines according to embodiments of the invention can be considered as stable as typical prior art TLP wind turbines.

In the TLP wind turbine of FIG. 4a, only a downwards force 306 is acting on each brace 302. The moment of this force 306 about the Y axis may be calculated as follows:

My=306·501　　　　　　　　　　　　　　[expression 3]

wherein 306 refers to the downwards force (as previously commented), and 501 refers to the distance between the longitudinal axis 309 of the tower 301 and/or buoyancy structure 300 and the point of the arm 302 where the downwards force 306 is acting.

In the TLP wind turbine of FIG. 4b, several forces are shown: the horizontal force component (or compression force) 400 and the vertical force component (or bending force) 403 (both from FIG. 3b), and a tension force 311 acting on the tower 301 due to the tension to which the mooring line 305 is subjected, and its horizontal force component 503. In this figure, the moment about the Y axis resulting from all these forces may be calculated as follows:

$M_y$=403·501+311·502　　　　　　　　　　　[expression 4]

wherein 403 refers to the bending force from FIG. 3b, 501 refers to the distance between the longitudinal axis 309 of the tower 301 (and/or buoyancy structure 300) and the point of the arm 302 where the bending force 403 is acting, 311 refers to the tension force acting on the tower 301 due to the tension to which the mooring line 305 is subjected, and 502 refers to an "orthogonal" distance between the mooring line 305 and an intersection point 504 between the longitudinal axis 309 of the tower/tank 301/300 and the longitudinal axis (X axis).

Also, the "orthogonal" distance 502 between the mooring line 305 and an intersection point 504 between the longitudinal axis 309 of the tower/tank 301/300 and the longitudinal axis (X axis) may also be expressed as follows:

502=(sin(90−α))·501　　　　　　　　　　[expression 5]

FIG. 4c is an isolated view of the triangle of FIG. 4b which is constituted by the tilted region of the mooring line 305, a corresponding region of the axis 309 and a corresponding region of the axis X. This figure shows with solid lines a rectangle triangle which permits deriving the previous expression 5 which expresses the length 502 in terms of the length 501 and the angle α.

Taking into account the expressions 2 and 5, and that the forces 306 and 311 are of the same magnitude, the moment $M_y$ for the wind turbine of FIG. 4b may be re-expressed as follows:

$$M_y = 306 \cdot (1 - \cos(\alpha)) \cdot 501 + 306 \cdot (\sin(90 - \alpha)) \cdot 501 =$$
$$= 306 \cdot 501 \cdot [1 - \cos(\alpha) + (\sin(90 - \alpha))] =$$
$$= 306 \cdot 501 \cdot [1 - \cos(\alpha) + \cos(\alpha)]$$

So, it may be concluded that the moment $M_y$ for the wind turbine of FIG. 4b may also be expressed as follows:

$M_y$=306·501　　　　　　　　　　　　　　[expression 6]

Taking into account the expressions 3 and 6, it may be assumed that the wind turbine of FIG. 4b (according to embodiments of the invention) has the same stability than the prior art wind turbine of FIG. 4a.

FIG. 4b also shows how the horizontal force component 503 of the tension force 311 acting on the tower 301 due to the tension to which the mooring line 305 is subjected may help to compensate (aerodynamic) loads from upper regions of the wind turbine due to wind forces W. The tension of the mooring line(s) 305 located in an upwind W position increases due to external (aerodynamic and hydrodynamic) loads, while the tension of the mooring line(s) located in a downwind position (not indicated in FIG. 4b) decreases. This difference in tensional stress causes the resultant force 503 to be in a direction which compensates upwind W aerodynamic forces.

All the calculations and principles indicated with reference to FIGS. 3a-4b have been suggested for a single brace. However, it may be appreciated that the same calculations and principles may be similarly applied to the other braces of the TLP wind turbine.

It can thus been concluded that embodiments of the invention may provide good stability (similarly to prior art TLP wind turbines), while helping to reduce aerodynamic loads (from upper regions of the wind turbine), and at the same time significantly reducing bending stress on the arms.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A floating Tension Leg Platform (TLP) supporting a wind turbine and comprising:
   a buoyancy structure comprising at least one floater tank which provides an excess buoyancy force;
   a wind turbine support structure arranged on the buoyancy structure;
   a plurality of braces extending radially outwardly from a region of the buoyancy structure or the wind turbine support structure, each brace having a distal end portion with respect to a longitudinal central axis of the buoyancy structure or the wind turbine support structure; and
   one or more tensioned mooring lines for each brace, each of the tensioned mooring lines having a first end and a second end;
   wherein in an operational state of the TLP and wind turbine:
      each of the distal end portions of the braces comprises a guiding element to allow a guided passage for the one or more tensioned mooring lines;
      each of the tensioned mooring lines is anchored to a seabed at its first end, and attached/coupled to a region of the buoyancy structure or the wind turbine support structure at its second end, the region being above the region of the buoyancy structure or the wind turbine support structure from which the braces extend radially outwardly; and
      each tensioned mooring line is guided by the guiding element of the corresponding brace.

2. The floating TLP according to claim 1, wherein at least one of the guiding elements comprises a hole in the corresponding brace.

3. The floating TLP according to claim 1, wherein at least one of the guiding elements comprises a pulley in the corresponding brace.

4. The floating TLP according to claim 3, wherein the pulley is movable along a length of the brace.

5. The floating TLP according to claim 1, wherein at least one of the guiding elements comprises a U-shaped depression in the corresponding brace.

6. The floating TLP according to claim 1, wherein at least one of the mooring lines comprises a cable.

7. The floating TLP according to claim 1, wherein the region of the buoyancy structure or the wind turbine support structure from which the braces extend radially outwardly is a region of the floater tank.

8. The floating TLP according to claim 7, wherein the region of the floater tank from which the braces extend radially outwardly is a bottom region of the floater tank.

9. The floating TLP according to claim 8, wherein the region to which each of the mooring lines is attached/coupled at its second end is a region of the floater tank.

10. The floating TLP according to claim 8, wherein the region to Which each of the mooring lines is attached/coupled at its second end is a region of the wind turbine support structure.

11. The floating TLP according to claim 7, wherein the region of the floater tank from which the braces extend radially outwardly is a top region of the floater tank, and the region to which each of the mooring lines is attached/coupled at its second end is a region of the wind turbine support structure.

12. The floating TLP according to claim 1, wherein the region of the buoyancy structure or the wind turbine support structure from which the braces extend radially outwardly is a region underneath a sea level.

13. The floating TLP according to claim 1, wherein the region of the buoyancy structure or the wind turbine support structure from which the braces extend radially outwardly is a region above a sea level.

14. The floating TLP according to claim 1, wherein the wind turbine support structure comprises a tower and a transition piece between the tower and the buoyancy structure.

15. The floating TLP according to claim 1, wherein the wind turbine support structure comprises a tower, and the buoyancy structure further comprises a transition piece between the tower and the floater tank.

16. The floating TLP according to claim 8, wherein the wind turbine support structure comprises a tower and a transition piece between the tower and the buoyancy structure.

17. The floating TLP according to claim 9, wherein the wind turbine support structure comprises a tower and a transition piece between the tower and the buoyancy structure.

18. The floating TLP according to claim 8, wherein the wind turbine support structure comprises a tower, and the buoyancy structure further comprises a transition piece between the tower and the floater tank.

19. The floating TLP according to claim 9, wherein the wind turbine support structure comprises a tower, and the buoyancy structure further comprises a transition piece between the tower and the floater tank.

20. The floating TLP according to claim 4, wherein the region of the buoyancy structure or the wind turbine support structure from which the braces extend radially outwardly is a region of the floater tank.

* * * * *